(No Model.)
R. WRIGHT.
HOSE.
No. 425,283.  Patented Apr. 8, 1890.
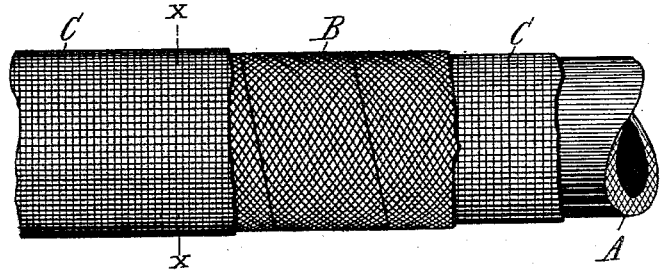
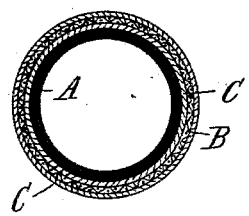  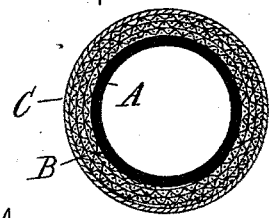
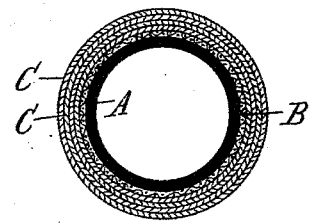
Witnesses:
P. M. Hulbert
A. Hamilton
Inventor:
Rufus Wright
By Thos. S. Sprague & Son
Atty.

UNITED STATES PATENT OFFICE.

RUFUS WRIGHT, OF CHICAGO, ILLINOIS.

HOSE.

SPECIFICATION forming part of Letters Patent No. 425,283, dated April 8, 1890.

Application filed August 7, 1889. Serial No. 320,039. (No model.)

*To all whom it may concern:*

Be it known that I, RUFUS WRIGHT, a citizen of the United States, residing at Chicago, in the county of Cook and State of Illinois, have invented certain new and useful Improvements in Hose, of which the following is a specification, reference being had therein to the accompanying drawings.

This invention relates to new and useful improvements in hose, especially designed for steam or suction hose, although it is applicable to nearly any use; and the invention consists in the peculiar construction of the hose by the insertion therein of woven wire-cloth cut on the bias, upon which is calendered rubber. This is used in combination with duck on one or both sides of the wire and rubber fabric, or simply with a rubber interior.

Heretofore flexible hose has been made in various ways, to obtain the necessary degree of strength, of rubber, or rubber and duck, with wire embedded in the body of the hose, wound spirally around or laid endwise, or having metallic strips in the walls of the hose, and in various other ways; but these are all open to the objection that the hose is no stronger than the weakest point, which would be the spaces between the wire, and, further, that as soon as the inner layer of rubber is weakened from any cause the duck, being brought into contact with the steam, is soon rotted and the life of the hose materially shortened.

The use of my invention enables me to construct a hose of great strength with ample flexibility and with long life, as compared with hose made in the manner known to the art at the present time.

In the drawings which accompany this specification, Figure 1 is a side view of a short piece of my hose with a part of each of the exterior layers removed, showing the general construction of each. Fig. 2 is a cross-section thereof on line X X. Figs. 3 and 4 are similar sections showing modifications of my hose.

In constructing my hose I preferably make an inner tube A of rubber first. Around this I secure a suitable outer ply or plies to form the requisite thickness, these outer plies consisting of the wire-cloth and rubber fabric and duck, or of the wire-cloth and rubber fabric alone, all as more fully hereinafter described.

In order to prepare my wire-cloth to be placed upon the hose, I take a suitable length, and upon each side of this I then place a sheet of rubber of suitable thickness and shape, the two being passed through calendering-rolls, whereby the rubber fills the mesh of the wire-cloth and makes a complete covering upon both sides thereof, thus forming a fabric the interior of which is of woven wire-cloth, the interstices between being filled with rubber, with a thin covering on each side, thus protecting the wire from moisture, which would penetrate the entire strip were the rubber placed only on the sides and should become broken. I then cut the wire on the bias and secure upon the inner tube by winding it around, either making one complete ply, and then outside of this securing a suitable layer or layers of duck, thereby increasing the flexibility of the hose without impairing its strength or making a number of plies around the inner tube. This arrangement may be varied to suit the uses to which the hose is to be put.

The arrangement in Fig. 1 shows the inner core of rubber A, around which is placed a covering of duck C, and over this is wound a single ply of wire-cloth and rubber fabric B, the whole being suitably coated with duck to give it a finished appearance.

Fig. 3 shows the inner core of rubber, a covering of several plies of the wire-cloth and rubber fabric, and an outer covering of duck.

Fig. 4 shows an inner core, a single ply of the rubber fabric and wire, and a number of layers of duck outside thereof, the duck being secured upon the rubber by any of the known means.

It is evident that the wire fabric adds greatly to the strength of the hose. Each separate layer of the wire-cloth is an independent basis of strength to resist the pressure from the inside, and in superimposing a number of layers one upon the other, as shown in Fig. 3, each successive layer re-enforces the other.

I have found by practical demonstration that to wind the hose with the strands of wire-cloth at right angles to the diameter and length of the hose would not make it of sufficient flexibility for ordinary purposes; but as the wire-cloth is cut upon the bias, whereby in winding the wire-cloth and rubber upon the inner tube the strands of the wire take a spiral course, ample flexibility is given to the hose for all ordinary purposes.

In the use of ordinary steam-hose constructed with an interior lining of rubber reenforced by cotton, duck, or other similar material, the one cause tending quickest to destroy its strength in case the inner lining becomes broken is the saturation of the fiber by the water which is carried a long distance through the duck by means of capillary action. In the use of steam-hose the life of the hose is also quickly destroyed by the action of the heat. In my construction these objections are entirely overcome, as no capillary action is possible, and no danger of rust to the wire is presented, as each strand of the wire is completely surrounded by the rubber.

I do not wish to limit myself to any particular kind of wire-cloth, as any practical metal may be used in place of the ordinary iron wire; nor do I desire to limit myself to the peculiar arrangement of the wire-cloth and rubber fabric and the inner core of rubber, as it is evident that for some uses the entire hose may be made of the wire-cloth and rubber fabric.

What I claim as my invention is—

As an improved article of manufacture, a hose consisting of an inner tube of rubber, a covering of duck over the same, a covering of wire-cloth having its meshes filled and its faces covered with rubber cut on the bias and wound helically thereon, and an outer covering of duck, substantially as described.

In testimony whereof I affix my signature, in presence of two witnesses, this 11th day of July, 1889.

RUFUS WRIGHT.

Witnesses:
FRED W. MORGAN,
JOHN HERKENHOFF.